S. H. DAVIS.
AUTOMOBILE SIGNAL.
APPLICATION FILED JUNE 8, 1915.

1,228,187.

Patented May 29, 1917.
2 SHEETS—SHEET 1.

Witnesses
F. W. Hover.
Roy K. Brown

Inventor
Samuel H. Davis
By B. W. Kadel
Attorney

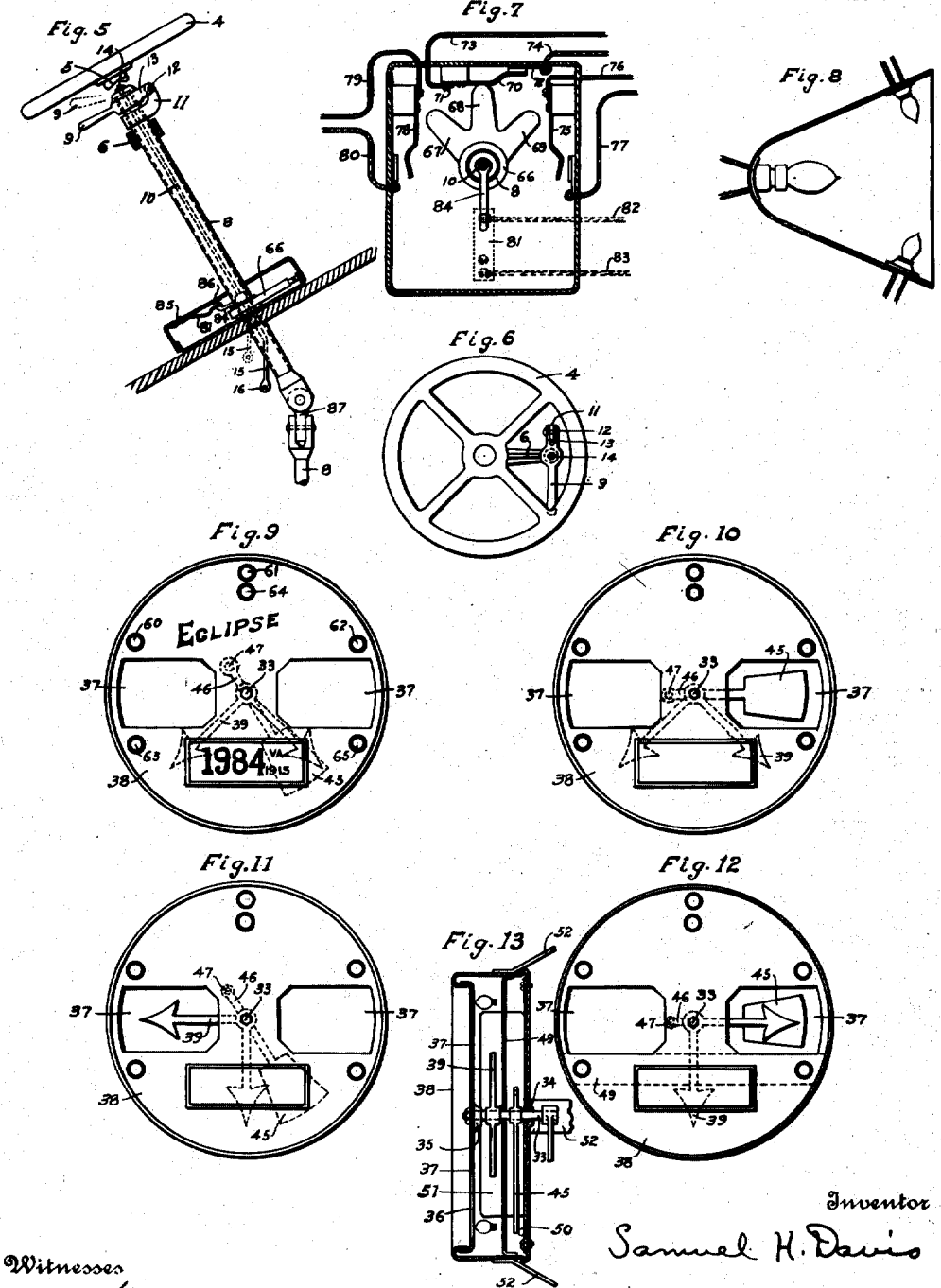

UNITED STATES PATENT OFFICE.

SAMUEL H. DAVIS, OF ROANOKE, VIRGINIA.

AUTOMOBILE-SIGNAL.

1,228,187.  Specification of Letters Patent.  Patented May 29, 1917.

Application filed June 8, 1915. Serial No. 32,887.

*To all whom it may concern:*

Be it known that I, SAMUEL H. DAVIS, a citizen of the United States, residing at Roanoke, in the county of Roanoke and State of Virginia, have invented certain new and useful Improvements in Automobile-Signals, of which the following is a specification.

This invention relates to signaling means or direction indicating means for automobiles or other vehicles, and the principal object thereof is to provide convenient and improved means for actuating such signals as well as improvements in the manner of constructing and arranging the various parts pertaining thereto.

With such general objects in view, the invention consists in the formation, combination and arrangement of elements as will be herein described and claimed.

In the drawings, Figure 1 is a plan view of an automobile having my invention applied thereto, the unrelated parts of the vehicle being indicated in dotted lines and the wiring for the electric lights which are used in connection with my invention being shown diagrammatically.

Fig. 5 is a side elevational view, partly in section, of the steering wheel and stand of the automobile, together with the portions of my device which are adjacent and attached thereto, this figure being drawn to an enlarged scale over that of Fig. 2.

Fig. 6 is a plan view of the steering wheel of the automobile and the hand lever of my device in position adjacent the said wheel.

Fig. 7 is a plan view of the electric switch and Fig. 8 a vertical, longitudinal, section of one of the headlights of my invention.

Figs. 9, 10, 11 and 12 are rear elevational views of the rear end signal showing the indicator as displaying various signals.

Fig. 13 is a transverse, horizontal section taken through the rear end signal.

Figure 1:
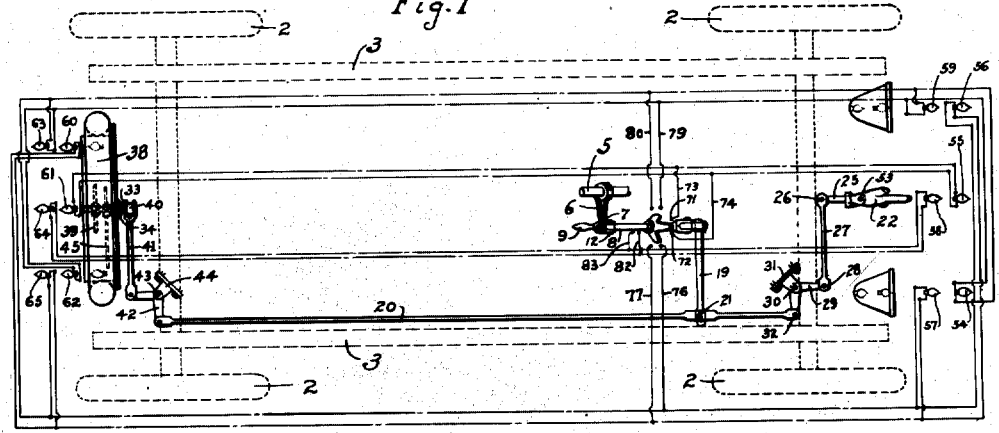
Figure 2:
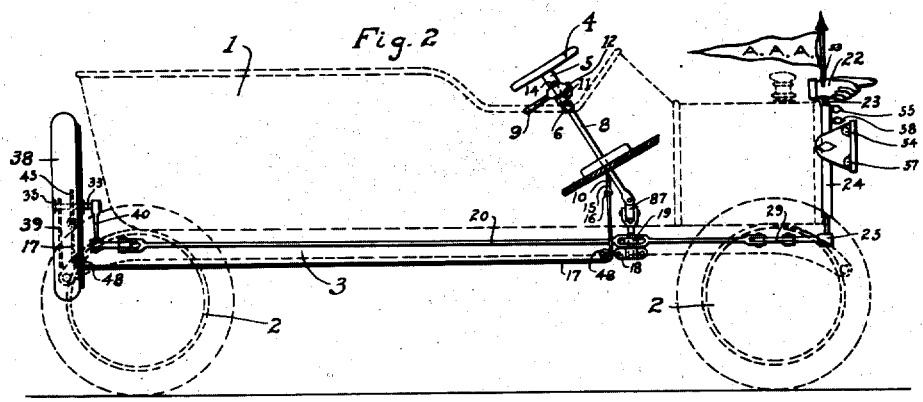
Fig. 2 is a side elevation shown in a manner similar to Fig. 1, and Figs. 3 and 4 are rear and front elevational views thereof respectively, all being shown in the same manner.

Referring now to these drawings wherein like parts are similarly designated, 1 represents the body, 2 the wheels, and 3 the frame of a conventional form of automobile. At 4 is the steering wheel on its stand 5. Clamped to this steering stand is a bracket or arm 6, the outer end 7 of which forms a bearing for my direction indicating shaft 8. This shaft 8 is disposed preferably parallel with and to the side of the steering stand and secured to the top thereof for the purpose of rotating this shaft is a hand lever 9.

This hand lever is intended to provide means for a two-fold movement, the first being the rotation of the shaft 8 and the second being to actuate vertically the small rod 10.

To this end the several parts are made and connected as follows:

The shaft 8 is made of a piece of hollow tubing or pipe and near the top is clamped or otherwise rigidly secured to it a bracket 11 which extends forwardly beyond the shaft and forms a horizontally disposed pivot point 12 for the frontward extension 13 of the hand lever.

The hand lever 9 is formed on its lower face with a depression or pocket to fit over the top of the shaft or pipe 8 so that the shaft 8 may be rotated by means of this hand lever, the said lever being held from revolving about the shaft by means of the extension 13 and pivot 12.

At the same time, and when in any rotative position the hand lever may be lifted up about the pivot 12, the depth of the pocket in the hand lever being such that the pocket will still have the end of the shaft in retention when the hand lever has been lifted to the maximum.

The rod 10, which has been previously referred to, is disposed within the hollow of the shaft 8 and at the top it extends through a hole in the hand lever and the nut 14 is applied to the end of the rod to retain the said rod on the hand lever.

With this construction, when the hand lever is lifted up about the pivot 12, the rod 10 will be lifted up also and the lower portion 15 thereof, which extends out through a slot in the shaft 8, will assume the position shown for it in dotted lines in Fig. 5, the hand lever being then in the position shown for it in Fig. 5. At 16 the rod 10 is provided with means for the attachment thereto of a cord or wire cable 17 for actuating a signal as will later be described.

The shaft 8 extends downward through the floor of the car and at the bottom is journaled in a bracket 18, a universal joint 87 being provided to change the direction of the shaft. Adjacent the bracket 18 there is secured to the said shaft an arm or lever 19 to which is operatively connected at the outer end of the said arm, a rod 20. As the hand lever is moved to the right or left the shaft 8 will be rotated and the rod 20 moved forward or backward through the medium of the arm 19. The arm 19 is connected to the rod 20 between the extremities of the said rod, the same being divided to admit the end of the arm 19 between the sides thereof, and a pin 21 is inserted through suitable holes in the rod and arm, the hole in the arm being slotted to compensate for the angularity of the arm as it is moved.

My signal system consists of front and rear-end signals, and I provide mechanical signals for day use and coöperating electric light signals for night use. The front-end day signal consists of a hand or pointer 22 positioned near the front of the machine and just over the radiator. The indicator 22 is affixed to a vertical shaft 23 carried in a suitable bearing 24, and to the bottom of this shaft 23 is secured a horizontally disposed lever or arm 25. To the outer end of this arm 25 is pivotally connected at 26 a rod 27, the other end of which is similarly connected at 28 to one arm of a bell-crank lever 29. This bell-crank lever is pivoted at 30 to a suitable bracket 31 and to the other arm of the bell-crank lever is pivotally connected at 32 the front end of the rod 20. Thus as the rod 20 is moved backward or forward, the pointer 22 is turned to the left or the right, indicating to the traffic officer that it is the intention to so turn the vehicle, the neutral position indicating that it is the intention to continue straight ahead.

The rear-end day signal consists of the following arrangement: Mounted on the rear of the car is a case 38 which is made preferably circular in form and of such a size as to allow one or more spare tires to encircle the same. Extending longitudinally of this case is a shaft 33, the same being journaled in bearings 34 and 35.

The rear head 36 of this case is provided with sight apertures 37 at each side. Affixed to the shaft 33 is a double arm pointer 39, the arms or pointers thereof being disposed at substantially 90 degrees from each other. In the neutral or mid-position these arms are in the position shown in Fig. 10 so that neither pointer is seen through either of the sight apertures.

Affixed to the front end of the shaft 33, which extends through the front head of the case, is a depending arm or lever 40 and pivotally connected to the lower extremity of this arm 40 is a rod 41, the other end of said rod being pivotally connected to one arm of a bell-crank lever 42. This bell-crank lever is fulcrumed at 43 to a suitable bracket 44 and to the other arm of the bell-crank lever 43 is pivotally connected the rear-end of the rod 20. Thus by the fore and aft movements of the rod 20 the double arrow 39 will be rotated with the shaft 33 so that an arm may be caused to appear through one or the other of the sight apertures. And the construction and connections described are such that the arrows will indicate directions at the rear harmoniously with the front indicator.

Figure 3:
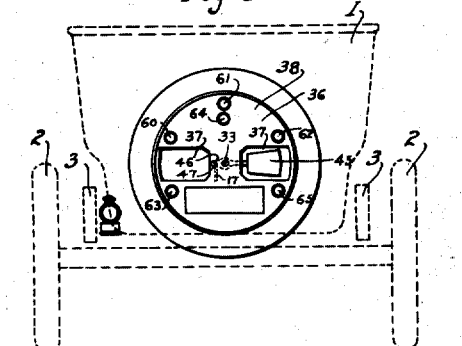

Pivoted loosely on the shaft 33 and to the front of the double arm-pointer 39 is a stop signal or flag 45. This flag has an extended portion 46 beyond the shaft 33 to which is secured at 47 the other end of the cord or cable 17, the same being guided and alined by means of suitable sheaves or pulleys 48. When the cord 17 is moved, by means of the hand-lever 9 and rod 10, the flag portion of the stop-signal will be raised to view through one of the sight apertures, it then being in the position shown in Figs. 3 and 10. When released, it drops out of sight to the position shown in Figs. 9 and 11. Fig. 12 shows this rear end signal with both the contemplated directions given and the stop signal displayed, indicating that it is the intension to turn to the right and then come to a stop.

It will be evident that the peculiar formation and operation of the hand lever 9 together with the disposition of the double arm pointer and the stop signal in the case 38 makes this double display possible.

At 49 is a suitable brace to afford lateral stiffness to the case 38 and also to provide means for preventing the double-point arrow from hanging up against the stop signal during their movements.

The inner surface of the case is preferably white enameled and may have detachable white enameled liners as at 50. In the bottom of the case also is provided an opening 51 to allow dust and dirt to drop out and so that the entire case may be washed out.

The rear face of the case will be utilized for the display of the license number and the name of the car and for other display purposes. Braces 52 are provided to stay the case 38 to the car.

In the top of the front indicator is an aperture 53 for the admission of a pennant holder or other device.

Thus I have shown the nature and operation of my day signals. It now remains to explain the signals to be used in conjunction therewith at night. These are a series of electric lights arranged in a peculiar order as to color and so connected that the mechanical movements of the day signals will automatically make the proper electrical connections for their harmonious display.

Figure 4:
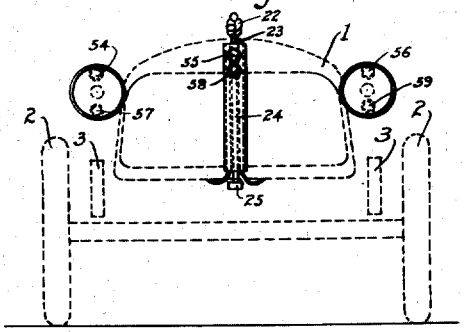

For the front of the car I provide each of the two main headlights with two additional smaller lights, arranged over and under the main light. The upper light in each case is red and the lower light green in color. At the center of the front of the machine also I provide two small lights arranged one over the other, this group being slightly higher than the side groups. These are arranged with a white light over a red light. These lights are numbered (see Fig. 4) 54—55 and 56 for the three upper lights and 57—58 and 59 for the three lower lights.

Similar lights are arranged on the rear face of rear case 38 in three similar groups of 2 lights each, and the numerals 60—61 and 62 represent three upper lights and 63—64 and 65 three lower lights. These lights are displayed through suitable openings in the rear of the case.

The wiring diagram of Fig. 1 shows these same lights and shows how they may be connected to correctly light up when each of the several signals is given, a description of such lighting being hereinafter given.

The form and operation of my improved switch for the automatic control of these lights will now be described.

Affixed to the shaft 8 is a switch throw member 66, the same having three arms 67—68 and 69. At 70 is a strip of spring brass forming a switch between terminals 71 and 72 for the electric wires 73 and 74 respectively. With the shaft 8 in the neutral or mid-position, the arm 68 of the member 66 has deflected the spring 70 so as to close the gap between the wires 73 and 74, and all lights on this circuit will now be illuminated. And from Fig. 1 it will be seen that the white lights 55 and 61 are at this time burning as the straight ahead signal.

When the shaft 8 is rotated to indicate a turn to the left the arm 68 will release the spring 70 and disconnect lights 55 and 61 and the arm 69 will deflect the spring 75, closing the gap between the wires 76 and 77 and from Fig. 1 it will be seen that this will give current to lights 56 and 57 at the front and 60 and 65 at the back of the machine, the combination being a night signal for a turn to the left.

Similarly a movement of the shaft 8 for a turn to the right will deflect the spring 78 and connect the wires 79 and 80, lighting the lamps 54 and 59 at the front and 62 and 63 at the rear, this being the night signal for a turn to the right.

For use with the stop signal I employ a spring 81 which is adapted, when deflected, to connect the wires 82 and 83 and thereby connect up the red lights 58 and 64, these lights indicating a contemplated stop. The spring 81 is deflected by means of an arm 84 attached to the rod 10 and extending out through a slot in the shaft 8. When the hand-lever 9 is raised, carrying with it the rod 10, the arm 84 deflects the spring 81 upward to connect the terminals 85 and 86. The release of the hand-lever allows the rod 10 to drop and the spring 81 to return to the open position.

For convenience and neatness the bearing 24 for the front indicator shaft is made with three vertical passageways, the middle one being utilized for the shaft 23 and the side ones forming conduits for the electric wires to the signal lights 55 and 58, these lights being mounted upon the front face of the bearing 24.

Thus I have described an embodiment of my invention. It will be understood that deviations may be made in the construction of my device, within the scope of the claims, without departing from the spirit thereof.

Having thus described my invention, what I claim is—

1. In an automobile signal, a shaft having a hand-lever affixed to the top thereof and adapted to form rotative means for the actuation of the said shaft, an arm secured to the lower end of said shaft, a rod pivotally connected between its extremities to the end of the said arm, a pair of bell-crank levers fulcrumed to convenient parts of the machine near the ends of the machine, one arm of each of the said bell-crank levers having pivotal connection with an end of the said rod, a front-end direction indicator mounted above and to the front of the machine, a vertical shaft to which is secured the said direction indicator, an arm secured to the lower extremity of said vertical shaft, a rod having pivotal connection at one end with one of the arms of the said front bell crank lever and having pivotal connection at its other end with the said arm on the front-end direction indicator shaft, a rear-end direction indicator comprising a double arm pointer, a case inclosing said pointer, a shaft journaled in said case, to which shaft is secured the said double-arm pointer, an arm secured to the said pointer shaft and a rod having pivotal connection at one end with one of the arms of the rear bell-crank lever and having pivotal connection at the other end with the said arm on the rear-end indicator shaft, substantially as described.

2. In an automobile signal, a shaft having a hand lever affixed to the top thereof and adapted to form rotative means for the actuation of the said shaft, an arm secured to the lower end of said shaft, a rod pivotally connected between its extremities to the end of the said arm, a pair of bell-crank levers fulcrumed to convenient parts of the machine near the ends of the machine, one arm of each of the said bell-crank levers having pivotal connection with an end of the said rod, a front-end direction indicator mounted above and to the front of the machine, a vertical shaft to which is secured the said direction indicator, an arm secured to the lower extremity of said vertical shaft, a rod having pivotal connection at one end with one of the arms of the said front bell-crank lever, and having pivotal connection at its other end with the said arm on the front-end direction indicator shaft, a rear-end direction indicator comprising a double arm pointer, a case inclosing said pointer, a shaft journaled in said case to which shaft is secured the said double-arm pointer, an arm secured to the said pointer shaft and a rod having pivotal connection at one end with one of the arms of the rear bell-crank lever and having pivotal connection at the other end with the said arm on the rear indicator shaft, a rear-end stop signal contained within the said rear-end case, said stop signal having a flag at one end and tension member connecting means at its opposite end, the pivot point being between the extremities of the said stop signal, a rod disposed approximately parallel with the said hand lever shaft and having tension member connecting means at its lower end, a tension member connecting said stop signal with the lower end of the said rod, and means for manually effecting the longitudinal movement of the said rod for the actuation of the said stop signal, substantially as described.

3. In an automobile signal, a hollow shaft having a bracket secured thereto adjacent one end thereof, a hand lever fulcrumed to said bracket and having operative relationship with the said shaft, the said hand lever extending over the end of the said shaft and having a grip portion disposed at the opposite side of said shaft from the said fulcrum point, a rod contained longitudinally within the hollow of the said shaft, said rod being secured at one end to the said hand lever and being adapted to be actuated longitudinally of the shaft by the movements of the said hand lever about its fulcrum point, the said hand lever being further adapted to form rotating means for the said shaft, front and rear end direction signals and a rear end stop signal, the said direction signals having operative relationship through a system of levers and rods with the said shaft, and being adapted to be operated by the rotation of the said shaft, the said stop signal having operative relationship with the said rod and being adapted to be actuated by the longitudinal movements of the said rod, substantially as described.

4. In an automobile signal, a rear end signal comprising a circular case of a size suitable for receiving an automobile tire circumferentially about the said case, the said case having front and rear heads, the said rear head being provided with a pair of laterally disposed sight apertures, a shaft extending longitudinally of the said case and being journaled therein, a double arm indicator secured to said shaft, the two arms thereof being disposed at approximately 90° from each other, a stop signal pivoted loosely on said shaft and to the front of the said double arm indicator, means for manually rotating the said shaft to such angular positions as to display first one of the arms of the said indicator in one of the said sight apertures and then the other of the said arms of the indicator in the other sight aperture, and means for manually rotating the said stop signal about the said shaft to such an angle as will make the same visible through one of the said sight apertures, substantially as described.

5. An automobile signal comprising a case, said case having front and rear heads, a pair of sight apertures disposed at either side of the said case, visual indicating means contained within the said case, means for displaying the said indicating means through the said sight apertures, a plurality of pairs of electric light apertures in the rear head of said case to each side of the center of said case, the apertures of each of said pairs being disposed one above and one below the said sight apertures, a third pair of electric light apertures in the head of said case disposed on the vertical center line thereof and above the apertures for the side pairs, lights contained within said case immediately in front of said apertures, and means for controlling said lights in conjunction with and in harmony with the mechanism for the actuation of the said visual signals, substantially as described.

6. In an automobile signal, visual front-end and rear-end signals, means within the reach of the driver for actuating the said signals, a series of front-end and rear-end electric light signals, and means acting in conjunction and in harmony with the mechanism for the actuation of the said visual signals for controlling the lights of the said electric light signals, the said electric signals being embraced in three distinct electrical circuits, the said controlling means comprising a three-arm throw attached to a convenient rotating member of the visual signal system, a leaf spring adjacent each arm of the said throw and adapted to be deflected thereby when the said throw is rotated, the said leaf springs forming electrical switches in the said electrical circuits, substantially as described.

7. In an automobile signal, visual front-end and rear-end signals, means within the reach of the driver for actuating said signals, a series of front-end and rear-end electric light signals, means acting in conjunction with and in harmony with the actuation of the said visual signals for controlling the lights of the said electrical signals, said means comprising a longitudinally-moving rod, an arm attached to said rod, a leaf spring having connection at one end with one wire of the electric circuit to the said electrical signals, the other end of said leaf spring being over the adjacent arm on the said rod, an electrical terminal adjacent the free end of the said leaf spring, the other wire of the circuit to the said electrical signals being in electrical communication with the said terminal, the said leaf spring being disposed in the path of travel of the arm on the said rod and being adapted when depressed thereby to complete the electrical connection to the said electrical signals, substantially as described.

In testimony whereof, I affix my signature in presence of two witnesses.

SAMUEL H. DAVIS.

Witnesses:
W. J. WILLAUER,
A. W. HAYNES.